UNITED STATES PATENT OFFICE.

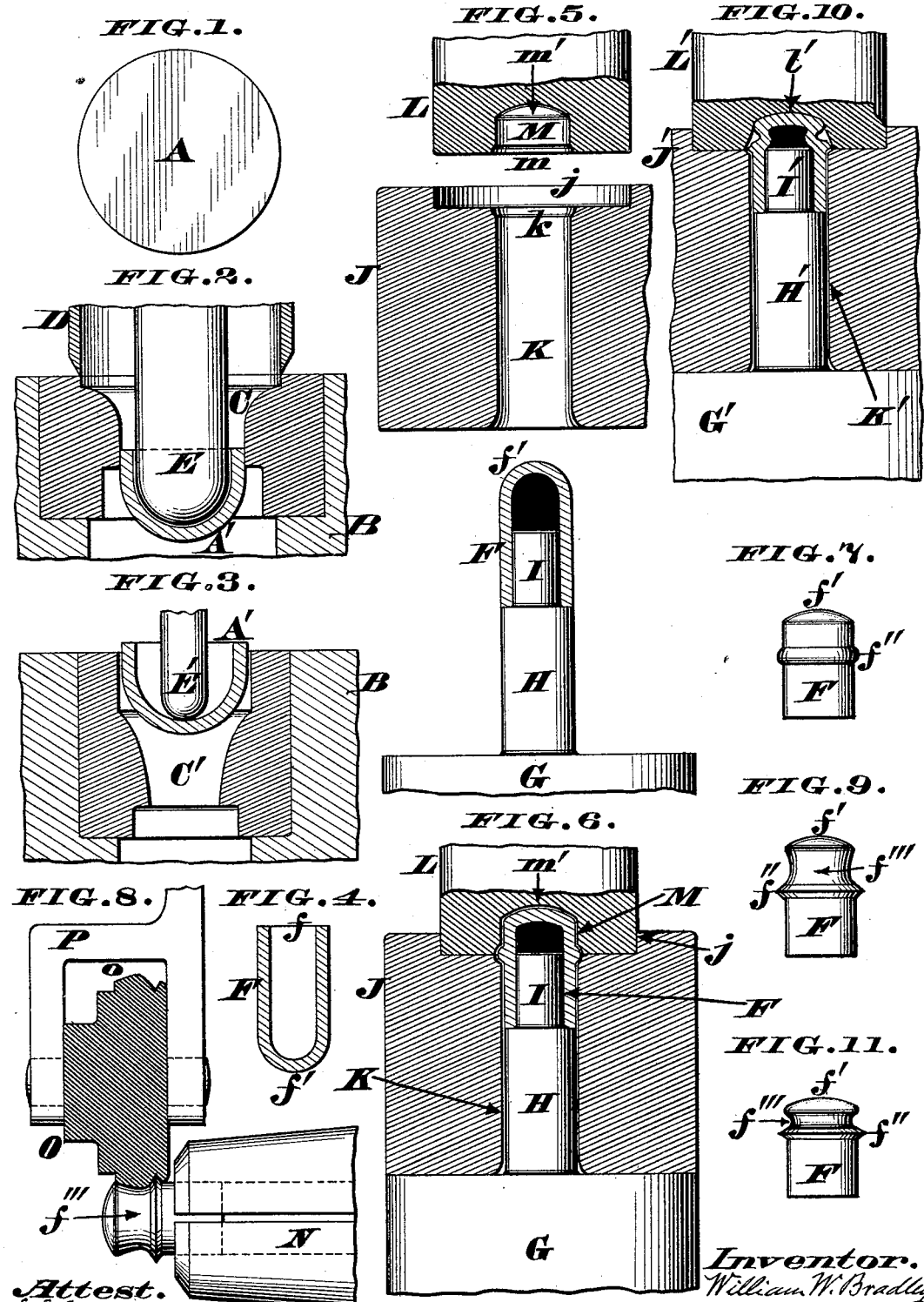

WILLIAM W. BRADLEY, OF NEWPORT, KENTUCKY, ASSIGNOR TO JOHN C. DUEBER, OF SAME PLACE.

METHOD OF MAKING WATCH-CASE PENDANTS.

SPECIFICATION forming part of Letters Patent No. 391,016, dated October 16, 1888.

Application filed July 16, 1888. Serial No. 280,017. (No model.)

*To all whom it may concern:*

Be it known that I, WILLIAM W. BRADLEY, a citizen of the United States of America, residing at Newport, in the county of Campbell and State of Kentucky, have invented a certain new and useful Process of Manufacturing Watch-Case Pendants, of which the following is a specification, reference being had therein to the accompanying drawings.

My invention comprises a novel method or process of manufacturing watch-case pendants from sheet-metal tubes which are open at one end, but closed with an integral head at the opposite end, the successive operations involved in said process being briefly as follows: The closed-end tube is produced in any suitable manner, but preferably by "drawing" it out from a disk-shaped blank, which blank is then supported upon a mandrel and subjected to the action of the first shaping-die, which die slightly flattens the end of said tube and at the same time forms an annular bead around the latter. The tube is now removed from the mandrel, grasped by a rapidly-revolving chuck, and brought in contact with a swaging-roller, the periphery of which is so shaped as to reduce the diameter of the tube above the bead and impart a more definite form to the annular swell. The tube is then disengaged from the chuck, mounted upon another mandrel, and finally subjected to the action of the second shaping-die, which further flattens the end of said tube and produces a pendant that is capable of being attached to a watch-case in the usual manner.

In the annexed drawings, Figure 1 is a plan of the disk-shaped blank to be converted into a watch-case pendant. Fig. 2 is a vertical section showing said blank in the act of being forced through the first drawing-die. Fig. 3 is a similar section of the blank inserted within the second drawing-die. Fig. 4 is an axial section of the blank after being brought to the desired tubular shape. Fig. 5 is a vertical section showing the various parts of the first shaping-die separated from each other, the tube being applied to the mandrel of the bed-plate spindle. Fig. 6 is a similar section, but showing the tube in the act of being operated on by this first die. Fig. 7 is a side elevation of the tube after being removed from said die. Fig. 8 is a sectional elevation showing this tube grasped by a chuck and brought in contact with a swaging-roller. Fig. 9 is a side elevation of the tube after being detached from said chuck. Fig. 10 is a vertical section showing this tube in the act of being operated on by the second shaping-die. Fig. 11 is a side elevation of the finished pendant.

A represents a disk-shaped blank, which is practically seven-eighths of an inch in diameter and about one thirty-second of an inch thick. This disk is made of any metal or composition of metals sufficiently ductile to be drawn out into a tube, which drawing operation may be effected in any suitable manner; but I prefer the following method:

B represents a bed-plate, provided with the first drawing-die, C. D is a cutting-punch, and E a drawing-punch. A strip of metal is placed upon the bed-plate, and when the punch D descends a disk is cut out of said plate, which disk is then driven through the die C by the descent of punch E, and is discharged in the shape of a practically hemispherical cup, A'. This cup-shaped shell is then seated within the second drawing-die, C', and after being driven through said die by the punch E' said shell is reduced to the shape seen in Fig. 4. Reference to this illustration shows that the blank has been converted into a cylindrical tube, F, open at one end, *f*, but closed at the opposite end by an integral head, *f'*, which latter is preferably crowning or convex.

It is to be understood, however, that the above-described operations constitute no part of my invention, and the right is reserved of producing the closed-end tube by any other operations or appliances that may prove the most efficient.

G in Figs. 5 and 6 represents the upper portion of a bed plate, from which a spindle, H, projects vertically, which spindle is the same diameter as the tube F, and terminates with a mandrel, I. This mandrel fits snugly within said tube, but is somewhat shorter than the latter.

J is a cylindrical holder of practically the same diameter as the bed-plate G, and provided with a vertical bore, K, adapted to fit snugly around the tube F and spindle H, the upper end of said bore being slightly counterbored at k. Furthermore, the top of holder J has a shallow cylindrical pit, j, adapted to receive the lower end of the plunger L of an ordinary drop or power press, said plunger being provided with a short bore, M, which is counterbored at m and has a concave top, m'. These devices L M m m' will hereinafter be alluded to as the "first shaping-die."

N in Fig. 8 shows a chuck adapted to admit the tube a certain distance, and then to hold it securely in place while said chuck is revolved at a high velocity.

O is a swaging-roller journaled within a holder, P, and having a periphery, o, which is so shaped as to reduce the diameter of a portion of the tube.

G' in Fig. 10 is a bed-plate, H' a spindle, I' a mandrel, J' a cylindrical holder having a bore, K', and L' is a plunger, which parts are practically the same as the devices seen in Fig. 5, with the exception that the mandrel J' is somewhat shorter than the mandrel J. Plunger L' has a bore, l', in its end, which plunger and bore constitute the second shaping-die.

After the tube F f f' has been produced it is placed upon the mandrel I, as seen in Fig. 5, the annular shoulder at the junction of said mandrel with the spindle H serving as a stop that limits the descent of said tube. Holder J is then seated upon the bed-plate G, thereby causing the bore K of said holder to surround the spindle H and the lower portion of the tube F. The plunger L is now dropped with considerable force and enters the pit j of the holder, which act shortens the tube on account of its upper end being brought in contact with the first shaping die, M m m'. This shortening of the tube causes the metal to be expanded or forced outwardly into the counterbores k and m of the holder and plunger, respectively, thereby forming a rounded bead or swell on said tube, as seen at f'' in Fig. 7. The plunger L is then raised, the holder J removed, and the tube F f f' f'' is slipped from off the mandrel I and grasped by the jaws of any approved form of chuck N, the latter being provided with a suitable gage or stop that limits the insertion of said tube. The chuck is now revolved at a suitable speed and the swaging-roller O is pressed against the protruding portion of the tube, the bead of which serves as a guide during this operation. The periphery o of this roller sharpens the bead, and at the same time reduces the tube so as to form a neck, f'''. As soon as this neck is formed, which is the work of a few moments, the tube is disengaged from the chuck and presents the appearance seen in Fig. 9. This tube is finally placed upon the secondary mandrel I' of spindle H', and the tube and spindle are surrounded by the holder J', after which act the plunger L' is dropped, thereby causing its bore l' to come in contact with the upper end of said tube. Consequently this second shaping-die, L' l', compresses the head, contracts the neck, and causes the tube to assume the shape of a complete watch-case pendant, as seen in Fig. 11, wherein F is the barrel of the same, f' the closed end or head, f'' the bead, and f''' the neck.

The above is a description of my process of manufacturing a very simple form of pendant; but the invention is not limited to any precise shape, as it is evident the shaping dies and roller may be arranged to produce an almost endless variety of pendants.

I claim as my invention—

The within-described process of manufacturing watch-case pendants from a tube having one end open and the other end closed, which process consists in upsetting the closed end of said tube and simultaneously forming an annular bead around it by means of suitable dies, then sharpening said bead and forming a neck upon said tube by the action of a roller while the tube is grasped by a rapidly-rotating mandrel, and finally compressing the tube in another set of dies, whereby the head is flattened and the neck simultaneously contracted, as herein set forth.

In testimony whereof I affix my signature in presence of two witnesses.

WILLIAM W. BRADLEY.

Witnesses:
JAMES H. LAYMAN,
N. ROCKHOLD.